United States Patent
Odenwald et al.

(10) Patent No.: US 8,224,944 B2
(45) Date of Patent: Jul. 17, 2012

(54) METHOD, APPARATUS AND SYSTEM FOR SERIAL ATTACHED SCSI (SAS) DOMAIN MANAGEMENT

(75) Inventors: Louis Henry Odenwald, Wichita, KS (US); Richard B. Taylor, Madison, AL (US)

(73) Assignee: LSI Corporation, Milpitas, CA (US)

( * ) Notice: Subject to any disclaimer, the term of this patent is extended or adjusted under 35 U.S.C. 154(b) by 637 days.

(21) Appl. No.: 12/144,777

(22) Filed: Jun. 24, 2008

(65) Prior Publication Data

US 2009/0319652 A1    Dec. 24, 2009

(51) Int. Cl.
G06F 15/173    (2006.01)
G06F 15/177    (2006.01)

(52) U.S. Cl. ........ 709/223; 709/220; 709/221; 709/224; 709/226

(58) Field of Classification Search .......... 709/220–227; 370/254
See application file for complete search history.

(56) References Cited

U.S. PATENT DOCUMENTS

| | | | | |
|---|---|---|---|---|
| 6,085,238 A * | 7/2000 | Yuasa et al. | | 709/223 |
| 7,444,445 B2 * | 10/2008 | Kubo et al. | | 710/104 |
| 7,657,613 B1 * | 2/2010 | Hanson et al. | | 709/220 |
| 7,668,925 B1 * | 2/2010 | Liao et al. | | 709/212 |
| 7,676,471 B2 * | 3/2010 | Basham et al. | | 707/781 |
| 8,116,226 B1 * | 2/2012 | Liao et al. | | 370/254 |
| 2005/0080881 A1 * | 4/2005 | Voorhees et al. | | 709/220 |
| 2005/0143079 A1 * | 6/2005 | Seto | | 455/450 |
| 2007/0061632 A1 * | 3/2007 | Uddenberg et al. | | 714/44 |
| 2007/0291785 A1 * | 12/2007 | Sharma et al. | | 370/464 |
| 2008/0028112 A1 * | 1/2008 | Kubo et al. | | 710/104 |
| 2008/0120687 A1 * | 5/2008 | Johnson | | 726/1 |
| 2009/0003197 A1 * | 1/2009 | Jones | | 370/221 |

\* cited by examiner

*Primary Examiner* — Haresh N Patel
*Assistant Examiner* — Linglan Edwards

(57) ABSTRACT

Embodiments of the invention include a method, apparatus and system for providing a Serial Attached SCSI (SAS) domain management application using a domain overlay architecture. The method includes comparing user constructs or data sets defining an existing domain overlay with device data that identifies various network devices in at least one SAS domain, and binding the existing domain overlay to an SAS domain if the existing domain overlay and the SAS domain are uniquely associated with one another. The method also includes creating a new domain overlay that is uniquely associated with an SAS domain for any SAS domain that is not bound to an existing domain overlay. A domain overlay and an SAS domain are not uniquely associated with one another unless the domain overlay references only network devices within the SAS domain and the network devices within the SAS domain are referenced only by the domain overlay.

14 Claims, 4 Drawing Sheets

| BINDING MATRIX | | PHYSICAL DOMAIN 54 | | | | |
|---|---|---|---|---|---|---|
| | | ID 1 | ID 2 | ID 3 | ID 4 | ID 5 |
| DOMAIN OVERLAYS 52 | DOMAIN #00 | | | | X | |
| | DOMAIN #01 | | | X | | X |
| | DOMAIN #02 | X | | | | |
| | DOMAIN #03 | X | | | | |
| | DOMAIN #04 | | X | | | |

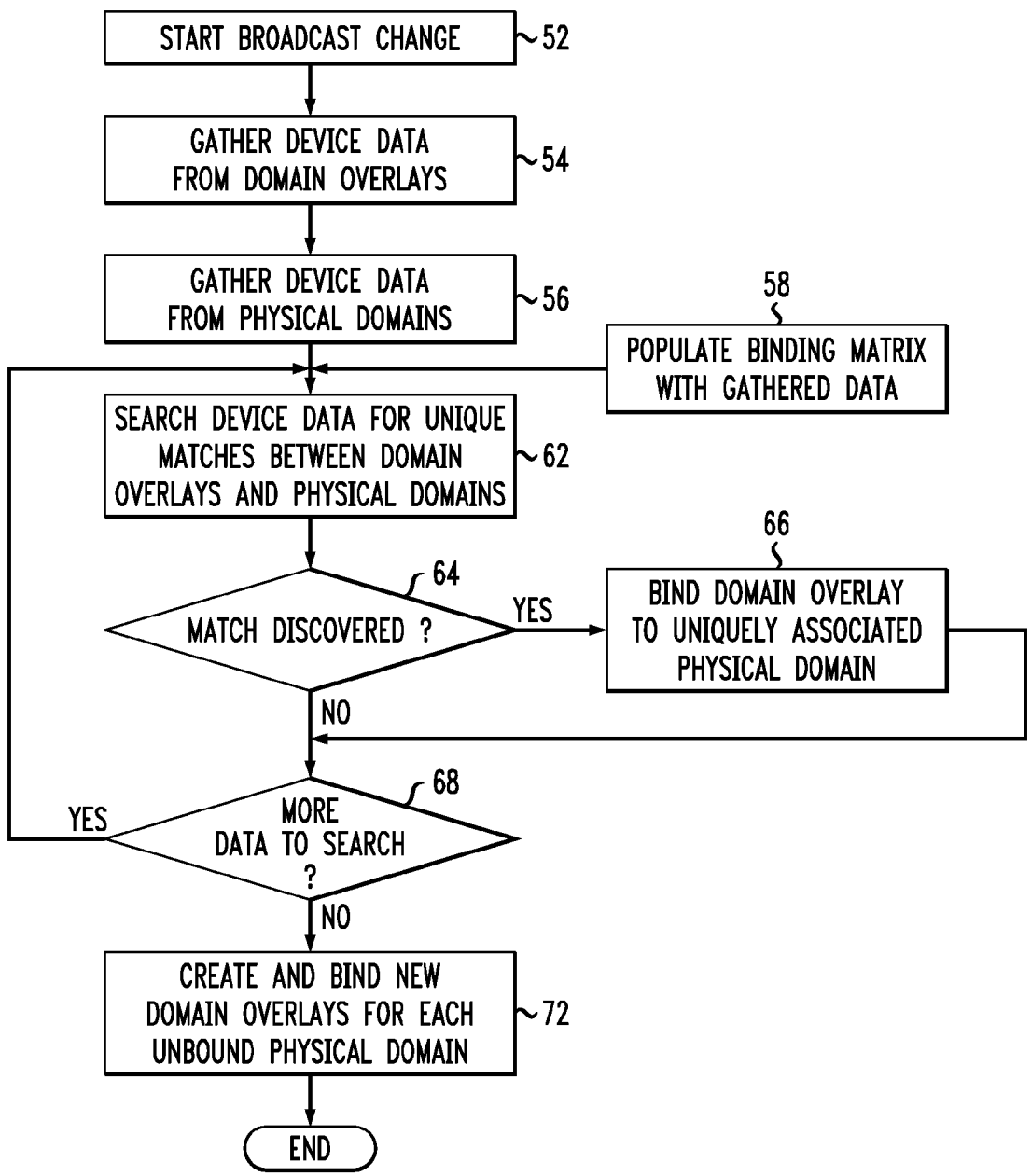

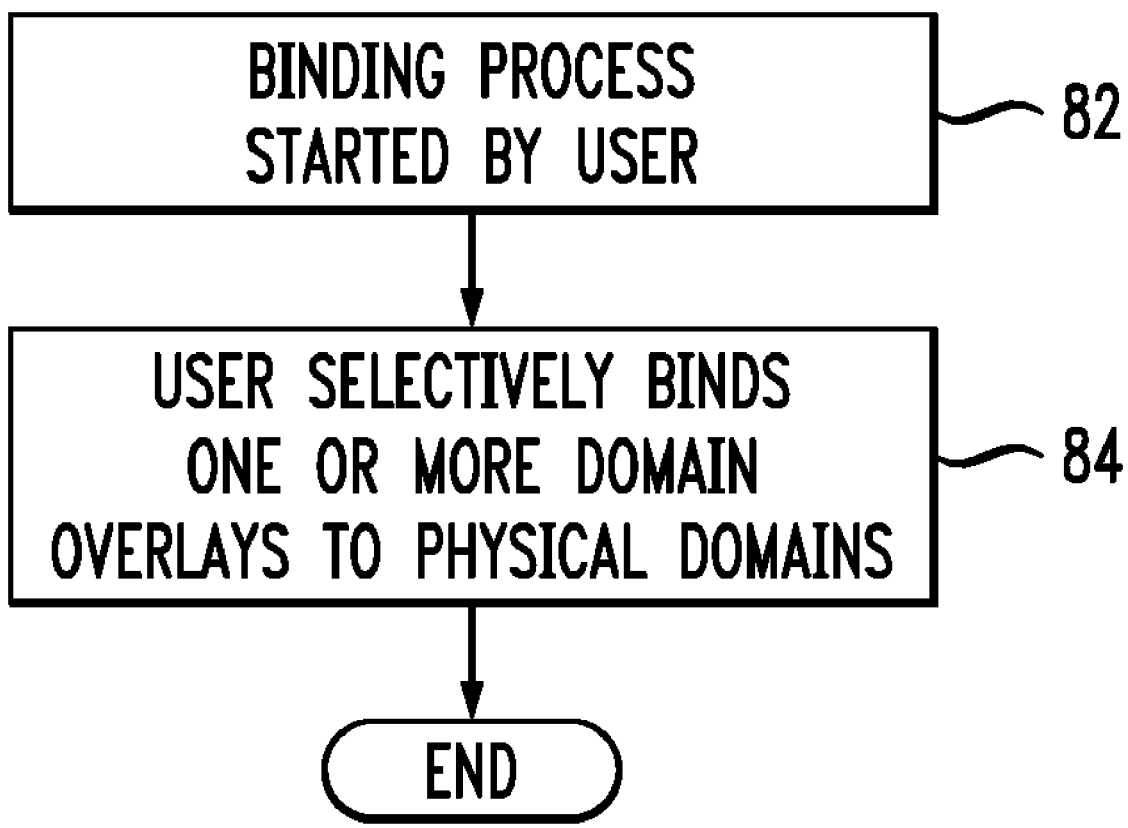

METHOD, APPARATUS AND SYSTEM FOR SERIAL ATTACHED SCSI (SAS) DOMAIN MANAGEMENT

BACKGROUND OF THE INVENTION

1. Field of the Invention

The invention relates to the Serial Attached SCSI (SAS) data transfer technology protocol. More particularly, the invention relates to methods, devices and system architectures for an SAS domain management application.

2. Description of the Related Art

SCSI refers to the Small Computer Systems Interface set of electronic interface standards that allow various devices to communicate with one another, e.g., computers to communicate with peripheral devices. Serial Attached SCSI (SAS) refers to a point-to-point serial protocol for data transfer technology between computer network storage devices, such as hard drives and tape drives. An SAS domain is an input/output (I/O) system that includes a set or network of SAS devices that communicate with one another. The management of SAS domains is a key element in enabling SAS technology to penetrate the storage area network (SAN) market. Management of SAS domains includes determining and providing domain network environment and topology information, displaying the status of devices within the domain, controlling devices within the domain (e.g., firmware update, reset, phy enable/disable), and controlling domain zoning.

For users within the SAN market, having a tool or application capable of managing SAS domains, either in-band or out-of-band, locally or remotely is desirable. However, providing such an SAS domain management tool poses some challenges. For example, an SAS domain management tool could be run as a stand-alone application on a workstation connected in-band to a domain populated with expanders or other suitable network switching devices. An SAS domain management tool also could be connected via Ethernet to an expander or switch in the same domain. Also, however, a user may not want a single SAS domain management tool.

Some domain management challenges have been addressed in conventional architectures and associated applications. However, such conventional management architectures did not have to deal with which domain to manage, or how to identify one domain from another, because the management tool resided within a single domain. Therefore, the user simply managed the domain in which the management tool resided. However, SAS domain management is capable of managing from the edge of a domain. Thus, SAS domain management is capable of concurrently managing multiple domains. Accordingly, SAS domain management has to struggle with the problems of domain identification, focus, and associated management interfaces. Accordingly, there is a need to manage theses challenges.

SUMMARY OF THE INVENTION

The invention is embodied in a method, apparatus and system for Serial Attached SCSI (SAS) domain management using an SAS domain management domain overlay architecture. The method includes comparing user constructs or data sets that define an existing domain overlay with device data that identifies various network devices in at least one SAS domain, and binding the existing domain overlay to an SAS domain if the existing domain overlay and the SAS domain are uniquely associated with one another. The method also includes creating a new domain overlay that is uniquely associated with an SAS domain for any SAS domain that is not bound to an existing domain overlay. A domain overlay and an SAS domain are uniquely associated with one another if the domain overlay references network devices within a single SAS domain and the network devices within the SAS domain are referenced by a single domain overlay.

BRIEF DESCRIPTION OF THE DRAWINGS

FIG. 2 is a block diagram of a binding matrix for binding domain overlays to physical domains within an SAS domain management application architecture according to embodiments of the invention;

FIG. 3 is a block diagram of a method for an SAS domain management application according to embodiments of the invention; and FIG. 4 is a block diagram of a method for an SAS domain management application according to alternative embodiments of the invention.

DETAILED DESCRIPTION OF EXEMPLARY EMBODIMENTS

Figure 1:
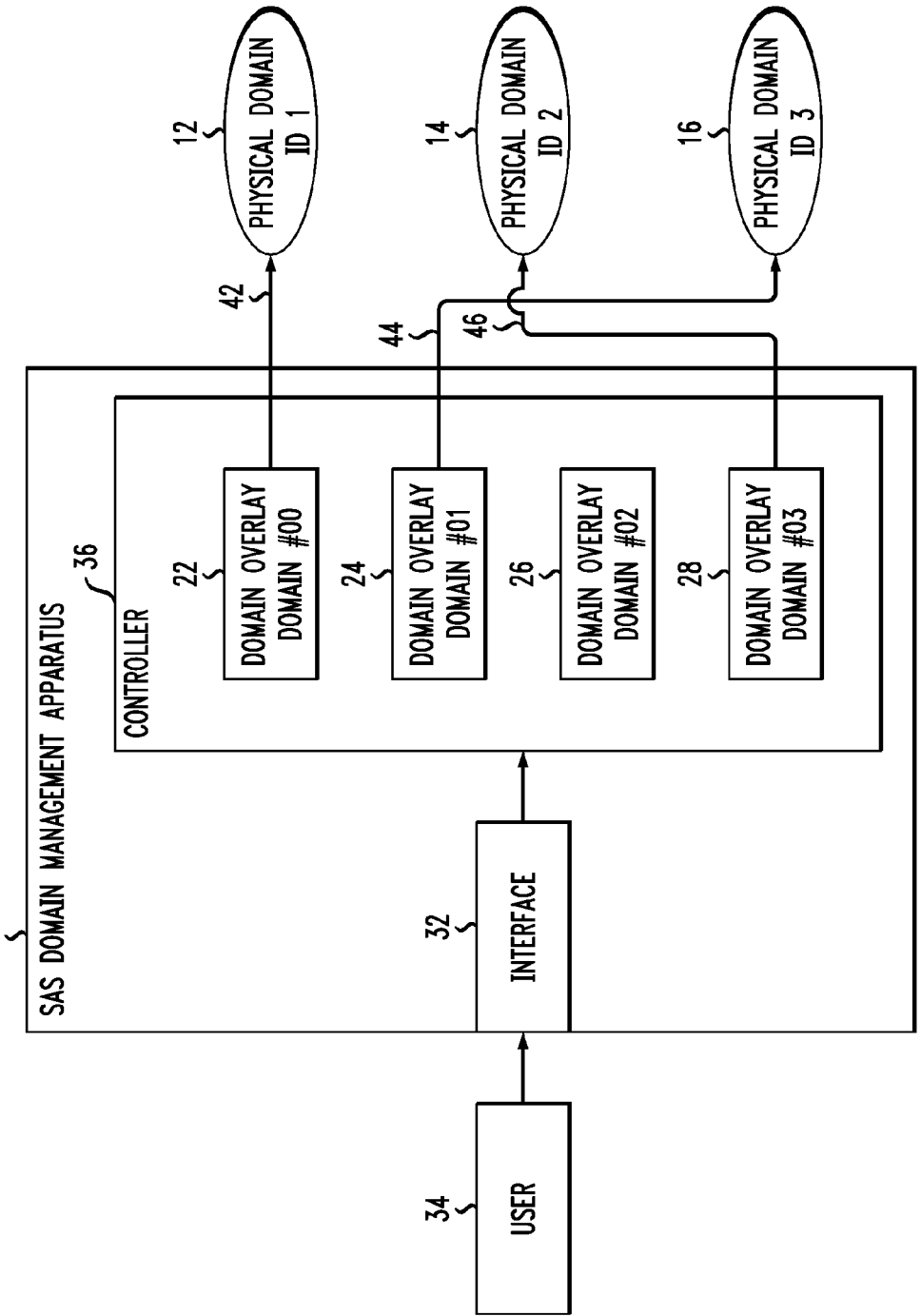
FIG. 1 is a schematic view of an SAS domain management application architecture according to embodiments of the invention.

In the following description, like reference numerals indicate like components to enhance the understanding of the invention through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

For proper SAS domain management, the appropriate management methods and devices with an SAS domain management architecture should be able to uniquely identify various domains within the network arrangement via multiple access points. Once identified, the domains need to be associated with, or bound to, overlays. Overlays include user constructs or data sets (alias and zoning definitions) that form a veneer through which a user views and interacts with the domains each bound by a respective overlay. Overlays are persistent, i.e., overlays live independently of their associated domains, and are bound to their respective domains through an auto-binding process or algorithm, or through another appropriate binding process, including a manually binding process.

For example, an application or service that manages SAS domains can be running on a work station within the network. The SAS domain management application or service can be connected to a single domain via an in-band connection, e.g., through an SAS host bus adapter (HBA) resident on the workstation. Alternatively, the SAS domain management application or service can be connected via an out-of-band connection, e.g., over an Ethernet connection to an expander or switch.

Methods for binding overlays to domains should not be dependent on the domain's access point, because there may be multiple access points and the access points may be volatile. For example, an overlay should not be bound to a particular domain via the HBA used to access the domain. If the HBA is or becomes faulty, the HBA could be swapped for a working one. Also, the connection to the domain could be moved from one HBA to another HBA.

Methods for binding overlays to domains should not be dependent on any arbitrary device or devices in the domain.

For example, an overlay should not be bound to any algorithmically-determined device within the domain, e.g., an expander with the lowest SAS address. One or more devices could be removed from a domain, or moved to another domain under an SAS domain management application or service.

Therefore, what is needed is a method, apparatus and architecture or system that binds overlays to physical domains based on or using the user-defined constructs or data sets present in the overlays. Such approach allows users to control binding of the overlays to the domains without adding to the complexity of the user interface.

Referring now to FIG. 1, shown is a schematic view of an SAS domain management architecture 10 according to embodiments of the invention. The SAS domain management architecture 10 includes a plurality of physical domains, such as a first physical domain (ID1) 12, a second physical domain (ID2) 14, and a third physical domain (ID3) 16. The SAS domain management architecture 10 also includes an SAS domain management application, tool or apparatus 20 that maintains control over a plurality of domain overlays, such as a first domain overlay (domain#00) 22, a second domain overlay (domain#01) 24, a third domain overlay (domain#02) 26, and a fourth domain overlay (domain#03) 28.

The SAS domain management apparatus 20 includes or is configured with an appropriate input interface 32 for allowing a user 34 to communicate with and instruct the SAS domain management apparatus 20. The SAS domain management apparatus 20 also includes a controller or SAS domain management controller 36 that is configured to, among other things, bind a domain overlay with a physical domain. As an example, shown in FIG. 1 is a first binding 42 between the first domain overlay (domain#00) 22 and the first physical domain (ID1) 12, a second binding 44 between the second domain overlay (domain#01) 24 and the third physical domain (ID3) 16, and a third binding 46 between the fourth domain overlay (domain#03) 28 and the second physical domain (ID2) 14. In general, the controller 36 controls the operation of the SAS domain management apparatus 20 and most of its functions.

The SAS domain management apparatus 20 can be comprised partially or completely of any suitable structure or arrangement, e.g., one or more integrated circuits. Also, it should be understood that the SAS domain management apparatus 20 includes other components, hardware and software (not shown) that are used for the operation of other features and functions of the SAS domain management apparatus 20 not specifically described herein. All relevant portions of the SAS domain management apparatus 20 can be partially or completely configured in the form of hardware circuitry and/or other hardware components within a larger device or group of components.

Each domain overlay includes a set of user constructs or data sets applied to a physical domain to enhance manageability. Users do not interact directly with the physical domains, instead the users interact with domain overlays, which can be bound to specific physical domains. The set of user constructs kept in a domain overlay are user-defined definitions for aliases, zone groups and zone sets. This data forms an overlay, or veneer, by which the physical domain information is presented to the user. This data is not necessary for ongoing management of a domain (e.g., zone set definitions are only necessary for the activation of a zone set), but such data makes management of a domain a more congenial experience.

For example, the set of constructs or data sets can include one or more aliases and sets of zoning definitions. For purposes of discussion herein, an alias is a user-defined name that is bound to an SAS address. A zone group is a set of phys (physical devices) in a zoned portion of a service delivery subsystem (ZPSDS) that can have the same access permissions. A zoned portion of a service delivery subsystem (ZPSDS) is a group of zoning expander devices that cooperate to control access between phys.

Defining SAS zoning behavior is a two step process. Phys are placed into zone groups, then access privileges are granted between groups. By default, members in a zone group do not have permission to communicate with any other phy, not even members within their own zone group. Permission must be granted prior to communication. Access, once granted, is reciprocal. For example, if Zone Group A is given permission to talk to Zone Group B, then Zone Group B automatically has permission to talk to Zone Group A.

A number of general rules apply to zone groups and zone sets. For example, a zone group may be a member of more than one zone set. Also, a phy may be a member of only one zone group per zone set. Also, a zone set must be active for its definitions to be applied to the domain. Also, only one zone set can be active at one time. When no zone set is active, zoning is disabled and domain access is unrestricted. Also, changes to the active zone set, such as a change to an alias, zone group, zone set membership, or zone group permissions, will not take affect until the next zone set activates Domain overlays allow the SAS domain management apparatus 20 to maintain user constructs independently of physical domains. Alias and zoning definitions residing in domain overlays are not lost when the domain overlay's associated physical domain disappears, e.g., when the physical domain is removed from the management of the SAS domain management apparatus 20, or disconnected from the SAS domain management application host system. The controller 36 is configured in such a way that the domain overlay is maintained and will attempt to rebind to the appropriate physical domain when that particular physical domain reappears.

The binding of a domain overlay to a particular physical domain will remain unaffected as long as the domain overlay can be uniquely associated with a single physical domain, even across the various domain changes, including devices being added to or removed from a physical domain, devices moving from one physical domain to another physical domain, and the changing of physical domain access points. A Broadcast (Change) is originated by an expander device to notify SAS initiator ports that an SAS domain change has occurred. A Broadcast (Change) also may be originated by SAS initiator ports to force other SAS initiator ports and expander ports to re-run the discover process.

In general, binding refers to the relationship between a domain overlay and a physical domain. The SAS domain management apparatus 20 can be configured to execute an auto-binding process, e.g., in which the SAS domain management apparatus 20 will bind each existing domain overlay to a physical domain if the data sets in the domain overlay can be uniquely associated with a single physical domain. The SAS domain management apparatus 20 also will create new domain overlays for any physical domains left unbound after the completion of the unique association portion of the binding process between existing domain overlays and physical domains. Binding activity by the SAS domain management apparatus 20, including any auto-binding processes, can occur in response to a Broadcast (Change), which typically is issued within as SAS network by a network initiator or other appropriate device when the SAS network starts up or a change is occurring within the SAS network.

Depending on the configuration of the SAS domain management apparatus 20, users alternatively may be able to override the auto-binding results of the SAS domain management apparatus 20 and manually bind a domain overlay to a physical domain. However, typically, the user manual override is not persistent. That is, the manual override usually only lasts until the next Broadcast (Change), which triggers the auto-binding process of the SAS domain management apparatus 20. The SAS domain management apparatus 20 usually is configured in such a way that any conflicting user constructs in the domain overlays themselves, which may be interfering with the binding process of the SAS domain management apparatus 20, be resolved to permit successful binding by the SAS domain management apparatus 20.

As part of the binding process, the SAS domain management apparatus 20 is configured to identify domain conflicts. That is, the SAS domain management apparatus 20 is configured to identify cases in which devices referenced by a single domain overlay reside in multiple physical domains. Similarly, the SAS domain management apparatus 20 is configured to identify cases in which devices residing in a single physical domain are referenced in multiple domains overlays. As discussed hereinabove, in such domain conflict situations, the domain overlay is not bound to the physical domain, but the SAS domain management apparatus 20 creates a new domain overlay for the physical domain.

The auto-binding process used by the SAS domain management apparatus 20 can be described in the form of a matrix. Referring now to FIG. 2, shown is a block diagram of a binding matrix 50 for binding domain overlays to physical domains within an SAS domain management application architecture according to embodiments of the invention. In the binding matrix 50 shown, domain overlays 52 are represented as rows and physical domains 54 are represented as columns. In this example, the binding matrix 50 includes five domain overlays (Domain#00 through Domain#04) and five physical domains (ID1 through ID5). The intersection of a domain overlay and a physical domain is flagged (X) if one or more devices that are present in the physical domain are referenced by the domain overlay.

A binding is created between the domain overlay and physical domain if there is one, and only one, flag (X) in the row of the particular domain overlay and the column of the particular physical domain. That is, a binding will be created by the SAS domain management apparatus 20 when a domain overlay is uniquely associated with a physical domain. More specifically, a domain overlay will be bound to a physical domain if one or more devices within the physical domain are referenced by the data set defining a particular domain overlay and the data set defining the particular domain overlay does not reference any devices within a different physical domain.

As an example, as shown in the binding matrix 50, suppose the data set defining the domain overlay Domain#00 references devices in the physical domain ID4 only. Also, suppose the data set defining the domain overlay Domain#01 references devices in the physical domain ID3 and the physical domain ID5; the data set defining the domain overlay Domain#02 references devices in the physical domain ID1 only; the data set defining the domain overlay Domain#03 references devices in the physical domain ID1 only; and the data set defining the domain overlay Domain#04 references devices in the physical domain ID2 only.

Accordingly, in this example, the domain overlay Domain#00 would be bound to the physical domain ID4, and the domain overlay Domain#04 would be bound to the physical domain ID2. The remaining domain overlays (Domain#01, Domain#02, and Domain#03) would be left unbound. As discussed hereinabove, the SAS domain management apparatus 20 typically will create and assign new domain overlays to the remaining physical domains ID1, ID3 and ID5. That is, a new domain overlay will be created subsequently to store the data set that references devices only in physical domain ID1. Similarly, a new domain overlay will be created to store the data set that references devices only in physical domain ID3 and a new domain overlay also will be created to store the data set that references devices only in physical domain ID5.

Referring now to FIG. 3, with continuing reference to FIG. 1 and FIG. 2, shown is a block diagram of a method 50 for SAS domain management according to embodiments of the invention. The method 50 can be or include a binding or auto-binding process that binds domain overlays to uniquely associated physical (SAS) domains, e.g., as discussed hereinabove. The method includes a step 52 of having a Broadcast (Change) received as a result of a change occurring to an SAS domain. When an SAS domain starts up initially, one or more SAS initiator devices and self-configuring expanders perform a discovery process according to SAS specifications to allow each network device and other SAS components in the SAS domain to generate and acquire information indicative of the overall geometry or topology of the SAS domain. A similar discovery process occurs when a change occurs to the topology of an SAS domain, such as one or more devices being added to or removed from the domain or one or more devices moving from one domain to another. The Broadcast (Change) step 52 can be one manner in which to initiate a new binding process between domain overlays and physical domains.

The method 50 also includes a step 54 of gathering device data from each domain overlay. As discussed hereinabove, each domain overlay includes a set of user constructs or data sets that define the domain overlay in terms of associated network devices. The device data within the data sets can include any data suitable for identifying a particular network device associated with the domain overlay. For example, the device data from each domain overlay can include the SAS address of the particular network device. The device data can be gathered by the SAS domain management apparatus 20 or other suitable network device, e.g., in any suitable manner.

The method 50 also includes a step 56 of gathering device data for the network devices within each physical SAS domain. For example, for each network device discovered within an SAS domain, the device data can include the SAS address of the particular network device or other suitable information that identifies the particular network device within the particular SAS domain. The device data for the network devices can be gathered by the SAS domain management apparatus 20 or other suitable network device, e.g., in any suitable manner.

The method 50 can include a step 58 of populating a binding matrix with the gathered data. As discussed hereinabove, a binding matrix is one manner in which to determine unique associations between domain overlays and physical domains. It should be understood that any suitable technique can be used to assist in determining unique associations between domain overlays and physical domains. The step 58 includes creating a binding matrix of domain overlays and physical domains, and populating the binding matrix using the gathered device data from the domain overlays and the gathered device data. For example, as discussed hereinabove, the intersection of a domain overlay and a physical domain is flagged if one or more devices that are present in the physical domain are referenced by the domain overlay.

The method 50 also includes a step 62 of searching for unique matches between domain overlays and physical domains. As discussed hereinabove, any suitable technique can be used to determine unique associations between a domain overlay and a physical domain. For example, if a binding matrix has been created and populated with device data gathered from the domain overlays and the physical domains, the binding matrix identifies unique associations between domain overlays and physical domains if the flagged intersection between a domain overlay row and a physical domain column is the only flag in the row of the particular domain overlay and the only flag in the column of the particular physical domain.

The method 50 also includes a step 64 of determining whether a match has been discovered. The step 64 determines whether there is a unique association between a particular domain overlay and a particular physical domain. If a unique association match between a domain overlay and a physical domain is discovered (Y), a step 66 of binding the domain overlay to the physical domain is performed. If a unique association match between a domain overlay and a physical domain is not discovered (N), then the method 50 determines if there is more gathered data to search to identify any unique associations between a domain overlay and a physical domain (a step 68).

If it is determined by the step 68 that there is more data to search (Y), the method 50 returns to the step 62 of searching device data for unique associations between domain overlays and physical domains. If it is determined by the step 68 that there is not any more data to search (N), the method 50 proceeds to a step 72 of creating new domain overlays for each unbound physical domain. That is, the step 72 creates a new domain overlay for each physical domain that is not bound to an existing domain overlay. In this manner, all physical domains will be bound to a uniquely associated domain overlay.

As discussed hereinabove, rather than using the auto-binding method 50, a user can manually bind a particular domain overlay to a particular physical domain, regardless of whether there is a unique association therebetween. Referring now to FIG. 4, shown is a block diagram of a method 80 for SAS domain management according to alternative embodiments of the invention, i.e., for a user to manually override any existing biding between a particular domain overlay and a particular physical domain. The method 80 is initiated by the user, as shown generally by a step 82. The user-initiated step 82 compares with the auto-binding process, which is initiated by the issuance of a network Broadcast (Change).

The method 80 also includes a step 84 of the user manually binding a particular domain overlay to a particular physical domain. As discussed hereinabove, the user can perform the manual binding step 84 to bind a particular domain overlay and a particular physical domain regardless of whether there is a unique association between the particular domain overlay and the particular physical domain. It should be understood that the user can perform the manual binding step 84 more than once, i.e., to bind more than one domain overlay with a particular physical domain. The user can perform the manual binding step 84 in any suitable manner, e.g., via the appropriate input interface 32 of the SAS domain management apparatus 20 (FIG. 2). As discussed hereinabove, the manual binding (override) resulting from the method 80 usually only lasts until the next Broadcast (Change), at which point the auto-binding method 50 is re-initiated.

It will be apparent to those skilled in the art that many changes and substitutions can be made to the embodiments of the invention herein described without departing from the spirit and scope of the invention as defined by the appended claims and their full scope of equivalents.

The invention claimed is:

1. A method for managing a plurality of Serial Attached SCSI (SAS) domains each including a set of network devices, wherein the set of network devices includes device data for identifying the network devices, the method comprising the steps of:

comparing, by a controller of a domain management apparatus coupled to the plurality of SAS domains, device data within at least one data set that defines an existing domain overlay with device data that identifies the network devices in at least one SAS domain, said domain overlay includes user constructs or data sets that form a veneer through which a user views and interacts with the domains each bound by a respective overlay, said comparing includes comparing the device data within the existing domain overlay and the device data within the SAS domains for device data that identifies a common network device, and populating a binding matrix for existing domain overlays and SAS domains having device data that identifies a common network device, and searching the binding matrix for unique associations between a single domain overlay and a single SAS domain;

binding, by the controller of the domain management apparatus, the existing domain overlay to an SAS domain when the at least one data set of the existing domain overlay is uniquely associated with the SAS domain; and creating, by the controller of the domain management apparatus, for any SAS domain that is not bound to an existing domain overlay, a new domain overlay when the at least one data set is uniquely associated with the SAS domain that is not bound to an existing domain overlay.

2. The method as recited in claim 1, wherein a domain overlay and an SAS domain are uniquely associated with one another when the domain overlay references only network devices within the SAS domain and the network devices within the SAS domain are referenced only by the domain overlay.

3. The method as recited in claim 1, wherein a first domain overlay and a first SAS domain are not uniquely associated with one another when the first domain overlay references any SAS devices within a second SAS domain or any SAS devices within the second SAS domain are referenced by a second domain overlay.

4. The method as recited in claim 1, wherein the method further includes at least one step of gathering device data for the existing domain overlay and gathering device data for at least one SAS domain.

5. The method as recited in claim 1, wherein the comparing step is performed in response to either one of an SAS domain starting up or an SAS domain changing its network device configuration.

6. The method as recited in claim 1, wherein the method further comprises a step of a user manually binding a domain overlay to an SAS domain regardless of whether the domain overlay and the SAS domain are uniquely associated with one another.

7. An SAS domain management application apparatus, comprising:
a processor and a memory coupled to the processor;
a user interface for communicating with a user;
a controller coupled to the interface and to manage a plurality of SAS domains each including a set of network devices, the controller to create a first domain overlay having a first plurality of user constructs that identify at least one network device within at least one SAS domain, said domain overlay includes user constructs or data sets that form a veneer through which a user views and interacts with the domains each bound by a respective overlay, the controller is further to compare user constructs within the first domain overlay with device data that identifies the network devices in at least one SAS domain, create and populate a binding matrix for existing domain overlays and SAS domains having device data that identifies a common network device, and to search the binding matrix for unique associations between a single domain overlay and a single SAS domain, bind the first domain overlay to an SAS domain when the first plurality of user constructs of the first domain overlay is uniquely associated with the first domain overlay, and create, for any SAS domain that is not bound to an existing domain overlay, a new domain overlay that is uniquely associated with the SAS domain that is not bound to an existing domain overlay.

8. The apparatus as recited in claim 7, wherein an SAS domain is uniquely associated with the first domain overlay when the first domain overlay references only network devices within the SAS domain and the network devices within the SAS domain are referenced only by the first domain overlay.

9. The apparatus as recited in claim 7, wherein the controller is configured to gather device data for the first domain overlay and gather device data for at least one SAS domain.

10. The apparatus as recited in claim 7, wherein the controller is configured to bind the first domain overlay to a uniquely associated SAS domain in response to either one of an SAS domain starting up or an SAS domain changing its network device configuration.

11. The apparatus as recited in claim 7, wherein the controller is configured to manually bind the first domain overlay to an SAS domain regardless of whether the first domain overlay and the SAS domain are uniquely associated with one another.

12. A non-transitory computer readable storage medium storing instructions that carry out a method for managing a plurality of SAS domains each including a set of network devices, the computer readable medium comprising:
  instructions for comparing device data within at least one data set that defines an existing domain overlay with device data that identifies the network devices in at least one SAS domain, said domain overlay includes user constructs or data sets that form a veneer through which a user views and interacts with the domains each bound by a respective overlay, said comparing includes comparing the device data within the existing domain overlay and the device data within the SAS domains for device data that identifies a common network device, and populating a binding matrix for existing domain overlays and SAS domains having device data that identifies a common network device, and searching the binding matrix for unique associations between a single domain overlay and a single SAS domain;
  instructions for binding the existing domain overlay to an SAS domain when the at least one data set of the existing domain overlay is uniquely associated with the SAS domain; and
  instructions for creating, for any SAS domain that is not bound to an existing domain overlay, a new domain overlay that is uniquely associated with the SAS domain that is not bound to an existing domain overlay.

13. The non-transitory computer readable storage medium as recited in claim 12, wherein a domain overlay and an SAS domain are uniquely associated with one another when the domain overlay references only SAS devices within the SAS domain and the SAS devices within the SAS domain are referenced only by the domain overlay.

14. The non-transitory computer readable storage medium as recited in claim 12, wherein a first domain overlay and a first SAS domain are not uniquely associated with one another when the first domain overlay references any SAS devices within a second SAS domain or any SAS devices within the second SAS domain are referenced by a second domain overlay.

* * * * *